Aug. 27, 1957 A. F. SPENGLER, JR 2,804,282
BORING DRILL
Filed Oct. 11, 1954
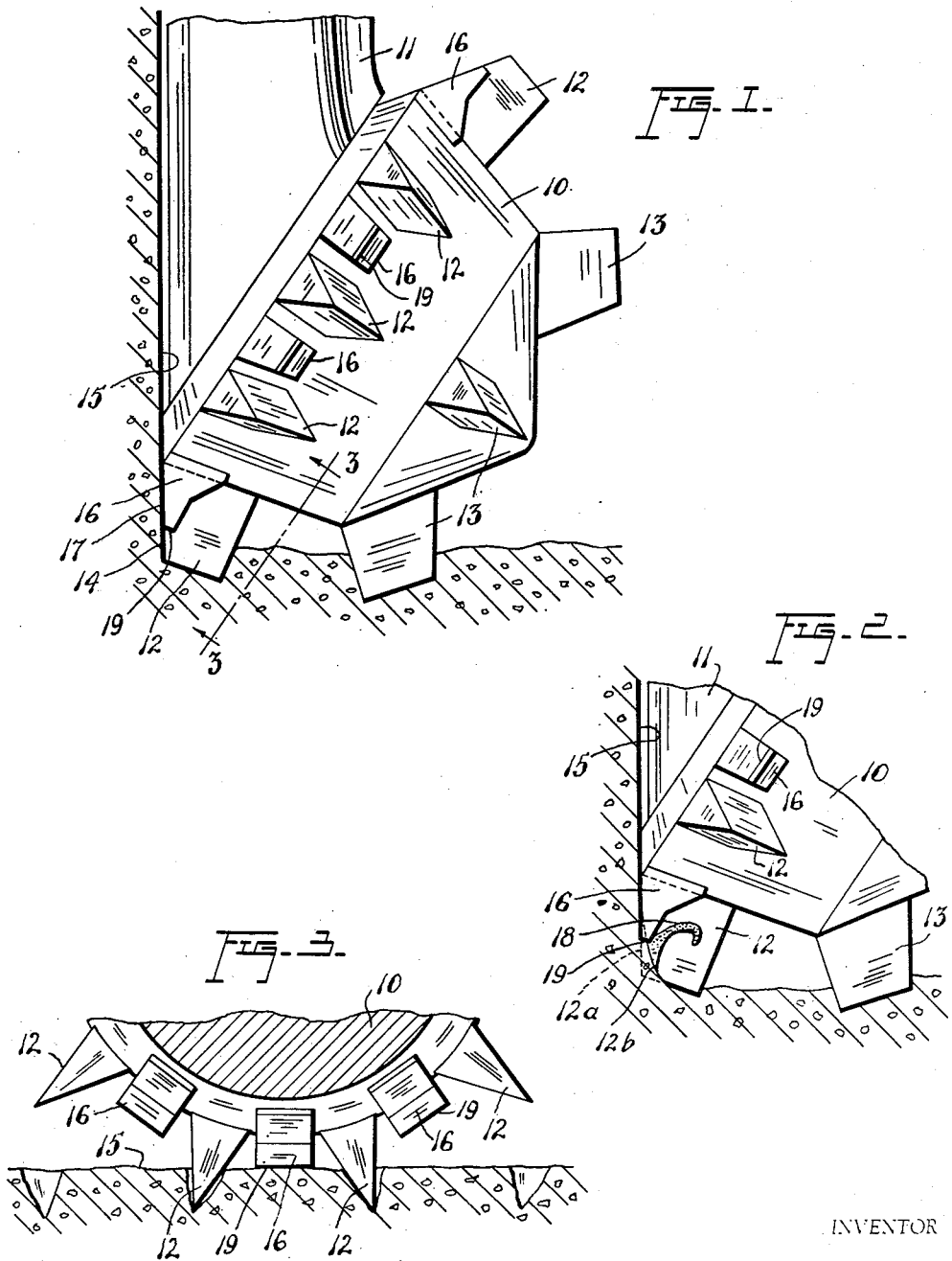
INVENTOR
Arthur F. Spengler, Jr.
BY [signature]
ATTORNEY United States Patent Office 2,804,282
Patented Aug. 27, 1957

2,804,282
BORING DRILL

Arthur F. Spengler, Jr., Memphis, Tenn.

Application October 11, 1954, Serial No. 461,364

1 Claim. (Cl. 255—345)

This invention relates to new and useful improvements and structural refinements in roller earth boring drills, that is, drills of the type wherein a plurality of cones equipped with sets of cutter teeth are rotatably mounted on a drill shank, and the principal object of the invention is to effectively smooth the side wall of a hole being drilled and to maintain the same at a proper gage, regardless of wear such as usually occurs on the cutter teeth after a period of use.

The above object is attained by providing a set of auxiliary teeth, hereinafter identified as shaving teeth, on each cone in spaces between the cutter teeth, the shaving teeth being so disposed that they effectively smooth the side wall of the hole while the drill is in operation and being so configurated with respect to the cutter teeth that they continue to smooth and maintain the hole at proper gage even after the cutter teeth have become dull or worn.

With the above more important objects and features in view and such other objects and features as may become apparent as this specification proceeds, the invention resides in the details of construction and arrangement of parts substantially as shown in the accompanying drawing, wherein like characters of reference are used to designate like parts and wherein:

Figure 1 is a fragmentary side elevational view of an earth boring drill, illustrating one of its rotary cones embodying the invention;

Figure 2 is a fragmentary side elevational view, similar to that shown in Figure 1, but illustrating the action of the invention when the cutter teeth become worn; and Figure 3 is a fragmentary sectional view, taken substantially in the plane of the line 3—3 in Figure 1.

With reference now to the accompanying drawing in detail, the numeral 10 designates one of the usual cones of the drill, the cone being rotatably mounted on a shank 11 in the conventional manner and provided with sets of cutter teeth 12, 13.

The cutter teeth 12 are disposed on the heel portion of the cone 10 in a circumferentially spaced relation and the outer cutting edges 14 of the teeth 12 are contiguous with the side wall 15 of the hole being drilled.

The essence of novelty in the invention resides in the provision of a set of hole shaving and gauging teeth 16 on the heel portion of the cone 10 in the spaces between the cutter teeth 12. The teeth 16 have flat outer shaving surfaces 17 which are disposed in the same operating plane as the outer cutting edges 14 of the teeth 12, so that the edges 17 effectively shave and smooth the side wall 15 of the hole being drilled.

It is to be noted that the shaving teeth 16 are of a substantially lesser height than the cutter teeth 12, preferably about one-half the height of the cutter teeth. Consequently, when the outer corner portion 12a of the cutter teeth 12 wears away and the cutting edges of the teeth 12 become rounded as shown at 12b in Figure 2, the shaving teeth 16 will continue to smooth the side wall of the hole as indicated at 18 and maintain the hole at proper gage.

For purposes of reinforcement the shaving teeth 16 may be wider at their base and taper outwardly from the cone 10. In a transverse plane, the teeth 16 are rectangular as shown in Figure 3, and have crests 19 disposed perpendicularly or transversely of a plane extending radially from the axis of the cone.

The teeth 16 may be formed integrally with the cone 10, although it is preferred that they be made separately from the cone from hard material such as cemented carbide and cast in place on the cone during manufacture.

It is to be also noted that because of their configuration and disposition in the spaces between the teeth 12, the shaving teeth 16 have ample clearance for the performance of their shaving action, so that they do not interfere or slow down the operation of the drill.

Although in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claim.

What is claimed as new is:

In a roller earth boring drill including a shank and a rotatable cone thereon, a set of circumferentially spaced cutter teeth provided on the heel portion of said cone and having outer cutting edges contiguous with the side wall of a hole being drilled, and a set of hole shaving and gauging teeth provided on the heel portion of said cone in the spaces between said cutter teeth, said shaving and gauging teeth being spaced circumferentially from the adjacent cutter teeth and being of a lesser height than the cutter teeth, said shaving and gauging teeth having heel portions provided with flat outer shaving surfaces disposed in the same operating plane as the outer cutting edges of the cutter teeth and having crests disposed transversely of a plane extending radially from the axis of the cone, whereby to smooth and gauge the side wall of a hole independently of the action of the cutter teeth.

References Cited in the file of this patent

UNITED STATES PATENTS

| | | |
|---|---|---|
| 2,104,822 | Scott | Jan. 11, 1938 |
| 2,333,746 | Scott et al. | Nov. 9, 1943 |